United States Patent Office 3,542,883
Patented Nov. 24, 1970

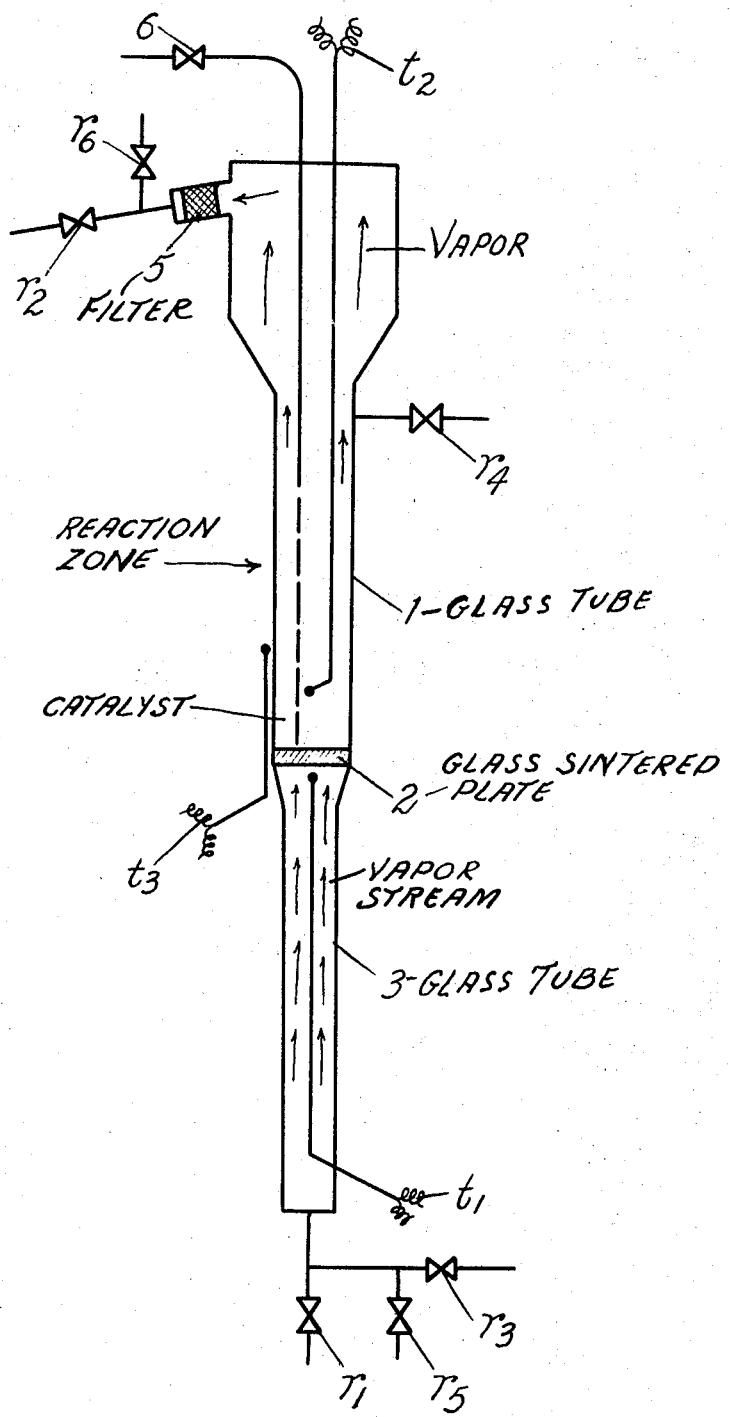

3,542,883
PROCESS FOR ISOMERIZATION OF 1,2-ALKYLENE OXIDES
Costin Nenitescu, Str. Scoalei 8; Emil Danciu, Str. Sergent Nitu Vasile 50; and Florica Tanase, Str. Tuzla 1, all of Bucharest, Rumania
Filed Aug. 10, 1966, Ser. No. 571,481
Int. Cl. C07c *33/02*
U.S. Cl. 260—632      5 Claims

ABSTRACT OF THE DISCLOSURE

Olefinically unsaturated alcohols can be obtained as the main product in yields as high as 1000 grams per liter of catalyst per hour, or higher, from the vapor-phase isomerization of the corresponding 1,2-alkylene oxide having from 3 to 5 carbon atoms when the catalyst is employed in the form of a fluidized bed or as a solid in pneumatic transport state, with respect to which said alkylene oxide is the supporting fluid. The catalyst, which may be used alone or in combination with inert filler, can be subjected to an autoregeneration merely by increasing the operating temperature by 40° to 50° C. for a period of from 15 to 45 minutes.

---

The present invention relates to a process for the vapor phase catalytic isomerization of 1,2-alkylene oxides containing 3 to 5 carbon atoms in a molecule to obtain the corresponding unsaturated alcohols, and more particularly to such a vapor state process wherein the vapor is passed through a layer of solid catalyst to fluidize the same.

Several processes are known for the isomerization of propene oxide to obtain both propionic aldehyde or allyl alcohol. For the isomerization to allyl alcohol it is known to use a fixed-bed catalyst and a catalyst in suspension in an inert, high boiling liquid. The fixed-bed process has the disadvantage of non-uniform reaction temperature in the catalyst layer which appears in the form of mobile overheated zones which lead to a rapid deactivation of the catalyst and to a low reproducibility of data. In addition, the usual granulations for a fixed bed do not allow good utilization of the catalyst active surface. The process with the catalyst finely dispersed in an inert liquid avoids the disadvantage of temperature non-uniformity but the reaction space is considerably increased and technical difficulties are encountered in the regeneration of the catalyst and recovery of the employed inert liquid. The selectivity of the catalyst depends on its nature and on the mode of its preparation and does not sensibly depend on the selected isomerization process.

According to the present invention, the isomerization process avoids the disadvantages of the known processes by passing the 1,2-alkylene oxide in the vapor state, at a determined temperature, through a layer of solid catalyst having suitable characteristics and granulation, and being suspended by the vapor stream of the reacting alkylene oxide as a fluidized bed or as a solid in pneumatic transport state.

It is therefore a principal object of the present invention to provide a process for the vapor phase catalytic isomerization of 1,2-alkylene oxides containing 3–5 carbon atoms to produce the corresponding unsaturated alcohol.

It is yet a further object of the present invention to provide such a process wherein the 1,2-alkylene oxide in the vapor phase is passed through a layer of solid catalyst to suspend the same as a fluidized bed or a solid in pneumatic transport state.

The process of the present invention can be carried out with various solid catalysts having acceptable activity and selectivity. Good results are obtained with catalysts based on lithium orthophosphate by itself or in mixtures with solid fillers, the latter being inert to the heterogenous reaction system. It is preferable to use fillers of chamotte, glass, silicon carbide, etc. free of iron oxides, in the form of powders having particles with diameters below 0.1 mm., thus conferring to the catalyst particles a higher density than to the grains obtained from paste of precipitated lithium orthophosphate only. Catalysts having between 0 and 50% of filler, preferably between 25 and 35%, can be used, the former being granulated after drying at 200° C., the grain size being between 0.01 and 1 mm., preferably between 0.1 and 0.5 mm.

The devices for a uniform distribution of the vapor flow on the cross section of the catalyst layer can be made of V2A sieve having more than 900 mesh/cm$^2$ or porous plates of glass or ceramic materials the size of the pores being between 10 and 100$\mu$, preferably between 50 and 90$\mu$.

According to the present invention, the process utilizing a fluidized bed catalyst can be carried out in vertical cyclindric reactors, the height-to-diameter (H/D) ratio being between 5:1 and 30:1, wherein the catalyst is in the form of a single layer, layer ranges or a layer provided with baffles at various levels. In the case of a single layer of a lithium orthophosphate catalyst with 30% of chamotte filler granulated to 0.2–0.32 mm., conversions of 20 to 70% for an operation were obtained. The allyl alcohol yields are between 80 and 90%, more often between 83 and 87%, as reported to the converted propene oxide, when the reaction temperature is between 220 and 350° C., preferably between 270 and 300° C. The speed of the vapor flow of propene oxide through the layer, as reported to the empty tube section is between 2 and 12 cm./sec., preferably between 4 and 8 cm./sec., and the contact time is between 0.3 and 3 sec., preferably between 0.7 and 2 sec. The productivity of the catalyst depends on the nature of the catalyst, on the nature and the percentage of the filler, on the reaction temperature, on the rate of feeding the propene oxide vapors, on the H/D ratio of the layer, and on operation time in the prescribed conditions. Under the described conditions, 1000 to 3000 and more frequently between 150 and 2500 grams of allyl alcohol per liter of catalyst and per hour are obtained. The secondary reaction products consist of 10–15% of propionic aldehyde and acetone in the ratio of 2:1 and 3–4% condensation products having normal boiling points above 130° C. as reported to the transformed propene oxide.

The catalyst activity is maintained at an acceptable level after an operation period of 15 to 25 hours or, in other words, after transforming a propene oxide quantity of 20 to 40 times the catalyst weight. After this period, in order to avoid an intensive formation of channels or a pistonation in the fluidized bed, it is therefore necessary, to regenerate the catalyst by removing the impregnated high boiling products. According to the invention, the process allows one to increase the time of an operation cycle from 15–25 hours to 30–40 hours by increasing the reaction temperature as soon as a reduction of the conversion rate reaches a minimum established value, the increase being of 40–50° C. above the operation temperature during 15–45 min. During this period, an autoregeneration of the catalyst takes place by eliminating the high boiling liquids included in the catalyst. Then the heating is continued at the operating temperature.

The regeneration of the catalyst can be carried out by one of the known methods for the fixed-bed isomerization. Good results are obtained by extracting the resins from the catalyst with a solvent, as for example: aromatic hydrocarbons, alkylene oxide to be isomerized or, products of the isomerization reaction as such or in mixture, etc., at the normal temperature or in conditions in which the selected solvent remains in liquid state. The operation can be carried out directly in the reactor or in an auxiliary plant.

According to the invention, the isomerization process with a catalyst pneumatically transported by the vapor stream of the reacting alkylene oxide is carried out in the same conditions as for the fluidized-bed process but at vapor flow velocities higher than 12 cm./sec. preferably above 15 cm./sec. at which velocity the catalyst particles are carried away by the vapor stream through the reaction zone.

Examples of carrying out the process according to the invention are presented as follows in connection with FIG. 1 which represents schematically and unlimitedly a reactor for carrying out the process.

EXAMPLE 1

In the reaction zone of the reactor schematically presented in FIG. 1, consisting of a glass tube 1 having a diameter of 31.5 mm. and 250 mm. in height, thermally isolated and provided at its bottom with a glass sintered plate 2 of Yena G1 type, are introduced 14.5 g. (30 cc.) of precipitated lithium orthophosphates dried at 200° C. and granulated to 0.2–0.32 mm. The catalyst layer of 37 mm. in height is fluidized by a vapor stream containing 99.8% of propene oxide to a rate of 190 g. per hour, the vapors being overheated at a temperature of 220° C. in a glass tube 3 of 18 mm. in diameter and 300 mm. in height, welded to the tube 1 and electrically heated. The temperatures were measured by means of a set of three thermoelectric pyrometers $t_1$, $t_2$ and $t_3$, the former two ($t_1$ and $t_2$) being protected by glass tubes having a diameter of 4 mm. The pyrometer $t_2$ allows for exploring of the reaction zone on both the vertical direction and on the radial direction of the layer. After reacting in the fluidized catalyst layer, the vapors pass into the upper zone of the reactor consisting of a glass tube 4 of 60 mm. in diameter and 100 mm. in height where, due to the flow rate reduction, the catalyst particles, eventually carried away, are separated from the vapors. Through a quartz-wool filter 5, the vapors go out from the reactor and pass to a cooling-condensation system not indicated in the figure. After 1.5 hours of operation, when the temperature of 287° C. was uniform to the limits of 2° C. in the whole catalytic space, a sample was taken which by gas-liquid chromatographic analysis showed the following composition: 42% of allyl alcohol, 1.5% of acetone, 2.5% of propionic aldehyde, 0.5% of normal and secondary propyl alcohol, 1.5% of high boiling secondary products, and the remainder being unreacted propene oxide. The allyl alcohol yield was therefore 88% as reported to the reacted propene oxide, and the productivity of this catalyst was 2650 grams of allyl alcohol per liter of catalyst per hour. As the used catalyst did not contain filler, it readily produced dust and was difficulty regenerated.

EXAMPLE 2

In the same reactor as in Example 1, there were introduced 20 grams (33 cc.) of catalyst obtained from lithium orthophosphate mixed with chamotte paste free of iron oxides, having a grain size of 0–0.1 mm., in such quantities that, after drying and grinding to a grain size of 0.2–0.32 mm. the catalyst should contain 30% of filler. By operating under the same conditions as in Example 1, a sample of reaction mixture taken after 2.5 hours showed the following analysis data: 38.5% of allyl alcohol, 6% of secondary light volatile products, 1.5% of secondary difficulty volatile products, and 54% of unreacted propene oxide, the allyl alcohol yield being 84% and the catalyst productivity—2200 grams of allyl alcohol per liter of catalyst per hour.

EXAMPLE 3

By further operating with the catalyst described in Example 2, after 20 hours of use, its productivity decreased below 2000 and the catalyst particles showed an agglomeration tendency. By increasing the temperature in the catalyst layer to 320° C. during 15 min. the vapor flow rate being 190 grams/hour, an autoreactivation of the catalyst was obtained. In this way, after 2.5 hours from reactivation period, that is, after operating 22.5 hours in the same cycle, the vapor flow rate being of 190 grams of 98.5% propene oxide per hour, at a reaction temperature of 300° C. the following analysis data were obtained: 46.5% of allyl alcohol, 8.5% of light volatile products, and 2.0% of high boiling products. The allyl alcohol yield remained unchanged and the catalyst productivity was 2680 grams of allyl alcohol per liter of catalyst per hour. The same catalyst, after 31 hours of operating period in the same cycle at 290° C., with a flow rate of 200 grams of vapors containing 96.0% propene oxide, still gave a productivity of 1850 grams and an allyl alcohol yield of 85% without showing a sensible agglomeration tendency.

EXAMPLE 4

By operating as in Example 2 but with 54.4 grams (86 cc.) of catalyst, its layer in the reaction tube 1 being 115 mm. in height, a sample taken after 8.5 hours of operation, when the temperature in the layer was 275° C., the feeding rate 285 grams of 98.5% propene oxide per hour, the analysis showed the following results: conversion in an operation 48%, an allyl alcohol yield of 85% and a productivity of 1350 grams of product per liter of catalyst per hour.

EXAMPLE 5

After an operating time of 32 hours the catalyst used in Examples 2 and 3 was evacuated from the reactor by means of vacuum through a pipe 6 introduced at the bottom of the layer. In the filter 5, no catalyst dust was found. There were recovered 27 grams (30 cc.) of catalyst impregnated with resins, which were extracted with boiling acetone until the yellow-brown color of the extract disappeared. After drying at 200° C., 20.9 grams (30 cc.) of regenerated catalyst were obtained which gave, after sieving 20.2 grams (30 cc.) of catalyst with grain size of 0.2–0.32 mm., the catalyst being then introduced in the reactor. A sample of the reaction mixture taken after 5 hours of operation at a temperature of 290° C. and with a flowing rate of 155 grams of 97.4% propene oxide per hour, showed a conversion of 54%, an allyl alcohol yield of 83%, and a productivity of the regenerated catalyst of 2250 grams per liter catalyst per hour. Another sample taken after 5 hours of operation at 285° C. and with a flow rate of 265 grams of 99% propene oxide per hour showed a conversion of 38%, and a yield of 85% of the end product, the productivity being 2830 grams of alcohol per liter of catalyst per hour.

EXAMPLE 6

The process was carried out under the same conditions as in Example 5 with the difference that the feeding rate of the vapors was increased to 500 grams of 96% propene oxide per hour in order to obtain a beginning of pneumatic transport of the catalyst in the narrow section 1 of the reactor. By using the same catalyst as in Example 5 without regenerating it, after operating during 12 hours at a temperature of 280° C., a conversion of 20%, a yield of 84% of allyl alcohol and a productivity of 4000 grams of allyl alcohol per kg. of catalyst per hour were obtained. In the filter 5 no carrying away of dust was detected.

EXAMPLE 7

A catalyst used as in Examples 5 and 6 was extracted with benzene at 25° C. directly in the reactor shown in FIG. 1. With that end in view, the cocks $r_1$ and $r_2$ were closed and the cocks $r_3$ and $r_4$ were opened by passing upward through the layer anhydrous benzene with a flow rate of 150° C./hour for an hour. The cocks $r_5$ and $r_6$ were opened to let out the liquid from the reactor, and an inert gas stream heated to 200° C. was passed through the same route for drying. In this way, from 24.2 grams (30 cc.) of catalyst impregnated with resins, 20.5 grams (30 cc.) of washed catalyst were obtained, the grain size of the latter being unchanged. By using it under the following conditions: 175 grams of 98% propene oxide per hour at a temperature of 2750 C. during 15 hours in a continuous system, this catalyst remained efficient giving a conversion of 32% and an allyl alcohol yield of 86% after having transformed in allyl alcohol a quantity of propene oxide 35 times its weight.

EXAMPLE 8

67 grams (100 cc.) of catalyst prepared as in Example 2, granulated in cubes with sides of 4 mm. after 18 hours of operation in fixed-bed reactor, at an average temperature of 285° C., the difference between the hot zone and the ends of the layer being 35° C., the feeding rate being 140 grams of propene oxide per hour gave a conversion of 51% in one operation, with a yield of 81% and a productivity of 580 grams of allyl alcohol per liter of catalyst per hour. 29 grams (43 cc.) of catalyst obtained from the reactor with fixed bed non-regenerated, and granulated to 0.2–0.32 mm., were introduced in the fluidized-bed reactor specified in Example 1. After operating 2.5 hours with the fluidized-bed catalyst at a temperature of 285° C. and with a feeding rate of 195 grams of 99% propene oxide per hour, this catalyst showed a conversion of 65% for the operation and a yield of 82% allyl alcohol, and a productivity of 2400 grams allyl alcohol per liter of catalyst per hour were obtained. In the fluidized-bed process according to the present invention an increase of 4.2 times as reported to the fixed-bed process was obtained.

The advantages of the process according to the present invention are as follows:

The temperature non-uniformity in the catalyst layer is elimnated which is a necessary condition for obtaining reproducible results:

A productivity 3 to 5 times higher as reported to other known processes is obtained;

It makes possible to introduce the automation of all operations including the catalyst regeneration and the separation of the reaction mixture.

We claim:

1. A process for catalytic isomerization of 1,2-alkylene oxide having from 3 to 5 carbon atoms to obtain, as the main product, the corresponding unsaturated alcohol, the process comprising: (I) suspending solid catalyst particles in a vapor stream of the 1,2-alkylene oxide at a recreation temperature between 200° and 350° C. to effect the catalytic isomerization, the solid catalyst comprising precipitated lithium orthophosphate; (II) after the conversion rate decreases, raising the temperature from 40° to 50° C. for a period of from 15 to 45 minutes to reactivate the catalyst while continuing to suspend said catalyst in a vapor stream of said 1,2-alkylene oxide and without interrupting said process; (III) lowering the temperature to a reaction temperature within the range of from 200° to 350° C.; and (IV) continuing the isomerization with the reactivated catalyst.

2. A process according to claim 1 wherein the catalyst is a mixture of lithium orthophosphate and filler, and the filler comprises a member selected from the group consisting of chamotte, glass and silicon carbide.

3. A process according to claim 1 wherein the catalyst is in the form of a fluidized bed.

4. A process according to claim 1 wherein the vapor stream flows at a rate from the minimum necessary for fluidization to that which places the solid catalyst in pneumatic transport state, the contact time of said vapor stream with said solid catalyst being between 0.3 and 3 seconds.

5. A process according to claim 1 wherein the alkylene oxide is propene oxide.

References Cited

UNITED STATES PATENTS

| Re. 25,770 | 4/1965 | Johanson | 208—10 |
| 2,617,709 | 11/1952 | Cornell. | |
| 2,660,609 | 11/1953 | Robeson et al. | |
| 2,664,433 | 12/1953 | Hudson. | |
| 2,879,307 | 3/1959 | Bezard et al. | 260—690 |
| 2,986,585 | 5/1961 | Denton. | |
| 3,090,816 | 5/1963 | Denton. | |
| 3,092,668 | 6/1963 | Bruson et al. | |
| 3,274,121 | 9/1966 | Schneider. | |

OTHER REFERENCES

Othmar, "Fluidization," (1956), pp. 1 to 4 and 77 to 86.

LEON ZITVER, Primary Examiner

J. E. EVANS, Assistant Examiner

U.S. Cl. X.R.

252—414; 260—593, 601